(12) United States Patent
Hebrink et al.

(10) Patent No.: US 7,345,137 B2
(45) Date of Patent: Mar. 18, 2008

(54) MODIFIED COPOLYESTERS AND OPTICAL FILMS INCLUDING MODIFIED COPOLYESTERS

(75) Inventors: Timothy J. Hebrink, Oakdale, MN (US); Martin E. Denker, Vadnais Heights, MN (US); Bert T. Chien, St. Paul, MN (US); Matthew B. Johnson, St. Paul, MN (US); Richard J. Thompson, Lino Lakes, MN (US); Kristopher J. Derks, Maplewood, MN (US); William W. Merrill, White Bear Lake, MN (US); Fuming B. Li, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 50 days.

(21) Appl. No.: 10/967,582

(22) Filed: Oct. 18, 2004

(65) Prior Publication Data

US 2006/0084780 A1  Apr. 20, 2006

(51) Int. Cl.
*C08G 63/00* (2006.01)
*C08G 63/02* (2006.01)
*B32B 27/08* (2006.01)
*B32B 27/36* (2006.01)

(52) U.S. Cl. .................. 528/272; 428/212; 428/480; 359/586

(58) Field of Classification Search .............. 428/212, 428/480; 359/586; 528/272
See application file for complete search history.

(56) References Cited

U.S. PATENT DOCUMENTS

| | | | |
|---|---|---|---|
| 3,884,850 A | 5/1975 | Ostrowski | |
| 5,486,949 A | 1/1996 | Schrenk et al. | |
| 5,559,159 A | 9/1996 | Sublett et al. | |
| 5,656,356 A | 8/1997 | Masuda et al. | |
| 5,882,774 A | 3/1999 | Jonza et al. | |
| 5,905,554 A | 5/1999 | Kyu | |
| 6,049,419 A | 4/2000 | Wheatley et al. | |
| 6,111,697 A | 8/2000 | Merrill et al. | |
| 6,113,811 A | 9/2000 | Kausch et al. | |
| 6,126,992 A | 10/2000 | Khanarian | |
| 6,221,556 B1 | 4/2001 | Gallucci | |
| 6,307,676 B1 | 10/2001 | Merrill et al. | |
| 6,333,821 B1 | 12/2001 | Kruger | |
| 6,352,761 B1 * | 3/2002 | Hebrink et al. ............. | 428/212 |
| 6,449,093 B2 | 9/2002 | Hebrink et al. | |
| 6,498,683 B2 | 12/2002 | Condo et al. | |
| 6,531,230 B1 | 3/2003 | Weber | |
| 6,569,515 B2 | 5/2003 | Hebrink et al. | |
| 6,574,045 B2 | 6/2003 | Hebrink et al. | |
| 6,609,795 B2 | 8/2003 | Weber et al. | |
| 6,635,337 B2 | 10/2003 | Jonza et al. | |
| 6,641,900 B2 | 11/2003 | Hebrink et al. | |
| 6,744,561 B2 | 6/2004 | Condo et al. | |
| 6,808,658 B2 | 10/2004 | Stover | |
| 2001/0011779 A1 | 8/2001 | Stover | |

(Continued)

FOREIGN PATENT DOCUMENTS

JP      5-170885      7/1993
WO      WO 99/36262   7/1999

*Primary Examiner*—Duc Truong

(57) ABSTRACT

Modified copolyesters having relatively low refractive indices and relatively high glass transition temperatures are disclosed. These modified copolyesters can be used in forming one or more layers in an optical film, such as a multilayer polymer film.

6 Claims, 2 Drawing Sheets

U.S. PATENT DOCUMENTS

| | | |
|---|---|---|
| 2002/0122252 A1 | 9/2002 | Hebrink et al. |
| 2002/0190406 A1 | 12/2002 | Merrill et al. |
| 2003/0016334 A1 | 1/2003 | Weber et al. |
| 2003/0053215 A1 | 3/2003 | Condo et al. |
| 2004/0085642 A1 | 5/2004 | Condo et al. |
| 2004/0086690 A1 | 5/2004 | Hebrink et al. |
| 2004/0099992 A1 | 5/2004 | Merrill et al. |
| 2004/0126549 A1 | 7/2004 | Ruff et al. |

* cited by examiner

MODIFIED COPOLYESTERS AND OPTICAL FILMS INCLUDING MODIFIED COPOLYESTERS

BACKGROUND

The present invention relates to modified copolyester polymers and optical films including modified copolyester polymers.

Polymeric films are used in a wide variety of applications. One particular use of polymeric films is in mirrors and polarizers that reflect light of a given polarization or wavelength range. Such reflective films are used, for example, in conjunction with backlights in liquid crystal displays to enhance brightness and reduce glare of the display. A polarizing film may be placed between the user and the backlight to polarize the light directed towards the user, thereby reducing the glare. A mirror film may be placed behind the backlight to reflect light towards the user; thereby enhancing brightness. Another use of polarizing films is in articles, such as sunglasses, to reduce light intensity and glare.

One type of polymer that is useful in creating polarizer or mirror films is a polyester. One example of a polyester-based polarizer includes a stack of polyester layers of differing composition. One configuration of this stack of layers includes a first set of birefringent layers and a second set of layers with an isotropic index of refraction. The second set of layers alternates with the birefringent layers to form a series of interfaces for reflecting light.

Thus, there is a need for the development of polyester films for use in optical films such as polarizers and mirrors which have improved properties including physical properties, optical properties, and lower manufacturing cost.

SUMMARY

Generally, the present invention relates to modified copolyesters and optical films including modified copolyesters. One illustrative embodiment is a co-polyethylene naphthalate copolymer having carboxylate subunits and glycol subunits and having a refractive index of 1.58 or less at 632.8 nm and a glass transition temperature of 90 degree Celsius or greater.

Another illustrative embodiment is a co-polyethylene terephthalate copolymer having carboxylate subunits and glycol subunits having a refractive index of less than 1.54 at 632.8 nm and a glass transition temperature of 60 degree Celsius or greater.

A further illustrative embodiment is a co-t-butyl-isophthalic acid copolymer having carboxylate subunits and glycol subunits having a refractive index of 1.53 or less at 632.8 nm and a glass transition temperature of 50 degree Celsius or greater.

Another illustrative embodiment is a multilayered polymer film having a plurality of first layers and a plurality of second layers. The first layers are made with a first polyester or copolyester which is birefringent. The second layers are made with a second copolyester polymer being a co-polyethylene naphthalate copolymer having carboxylate subunits and glycol subunits and having a refractive index of 1.58 or less at 632.8 nm and a glass transition temperature of 90 degree Celsius or greater.

Another illustrative embodiment is a multilayered polymer film having a plurality of first layers and a plurality of second layers. The first layers are made with a first polyester or copolyester which is birefringent. The second layers are made with a second copolyester polymer being a co-polyethylene terephthalate copolymer having carboxylate subunits and glycol subunits having a refractive index of less than 1.54 at 632.8 nm and a glass transition temperature of 60 degree Celsius or greater.

A further illustrative embodiment is a multilayered polymer film having a plurality of first layers and a plurality of second layers. The first layers are made with a first polyester or copolyester which is birefringent. The second layers are made with a second copolyester polymer being a co-t-butyl-isophthalic acid copolymer having carboxylate subunits and glycol subunits having a refractive index of 1.53 or less at 632.8 nm and a glass transition temperature of 50 degree Celsius or greater.

Another embodiment is a multilayered polymer film having a plurality of first optical layers including a birefringent first copolyester or polyester and a plurality of second optical layers including a second copolyester being a cycloaliphatic copolyester/polycarbonate polymer blend and having an in-plane birefringence of 0.04 or less at 632.8 nm, after the multilayered polymer film has been formed.

A further embodiment is a multilayered polymer film including a plurality of first optical layers including a birefringent first copolyester or polyester, a plurality of second optical layers comprising a second copolyester having an in-plane birefringence of 0.04 or less at 632.8 nm, after the multilayered polymer film has been formed, and a non-optical skin layer disposed on the plurality of first optical layers or plurality of second optical layers, the skin layer including a cycloaliphatic copolyester/polycarbonate blend.

In a further embodiment, a multilayered polymer film is disclosed having a plurality of first layers and a plurality of second layers. The first layers are made with a first polyester or copolyester which is birefringent and possesses a nearly truly uniaxial character in its refractive indices at 632.8 nm. The second layers are made with a second copolyester polymer being a co-polyethylene naphthalate copolymer having carboxylate subunits and glycol subunits and having a glass transition temperature of 90 degree Celsius or greater.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
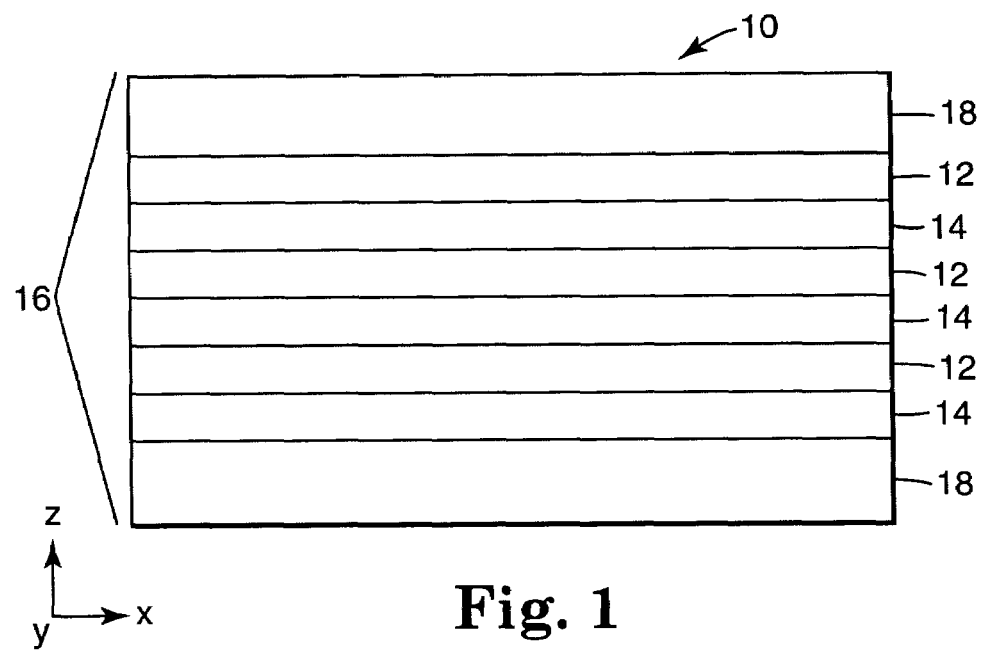
FIG. 1 is a schematic cross-sectional view of one embodiment of a multilayered polymer film according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention relates to modified copolyesters and multilayered polymer films formed from the modified copolyesters for optical applications and the use of comonomer subunits to enhance the properties of the polymer films. The properties of a given polyester are typically determined by the monomer materials utilized in the preparation of the polyester. A polyester is often prepared by reactions of one or more different carboxylate monomers (e.g., compounds with two or more carboxylic acid or ester functional groups) with one or more different glycol monomers (e.g., compounds with two or more hydroxy functional groups). Each set of polyester layers in the stack typically has a different combination of monomers to generate the desired properties for each type of layer.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless stated otherwise.

Unless otherwise stated, all numbers expressing quantities of ingredients, properties such as molecular weight, reaction conditions, and so forth used in the specification and claims are to be understood as being modified in all instances by the term "about." Accordingly, unless stated to the contrary, the numerical parameters set forth in the foregoing specification and attached claims are approximations that can vary depending upon the desired properties sought to be obtained by those skilled in the art utilizing the teachings of the present invention.

Mole percent or mol % and the like are synonyms that refer to the concentration of a substance as the moles of that substance divided by the moles of the composition and multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a polymer" includes a mixture of two or more polymers. As used in this specification and the appended claims, the term "or" is generally employed in its sense including "and/or" unless the content clearly dictates otherwise.

FIG. 1 shows a multilayered polymer film 10 which may be used, for example, as an optical polarizer or mirror. The film 10 includes one or more first optical layers 12, one or more second optical layers 14, and one or more non-optical layers 18. The first optical layers 12 are preferably birefringent polymer layers which are uniaxially- or biaxially-oriented. The second optical layers 14 may also be polymer layers which are birefringent and uniaxially- or biaxially-oriented. More typically, however, the second optical layers 14 have an isotropic index of refraction which is different from at least one of the indices of refraction of the first optical layers 12 after orientation. The methods of manufacture and use, as well as design considerations for the multilayered polymer films 10 are described in detail in U.S. Pat. No. 5,882,774 and U.S. 2001/0011779A1, the disclosures of which are incorporated by reference herein to the extent they are not inconsistent with the present disclosure. Although, the present invention will be primarily exemplified by films 10 with second optical layers 14 which have an isotropic index of refraction, the principles and examples described herein may be applied to multilayered polymer films with second optical layers 14 that are birefringent, as described in U.S. Pat. No. 6,113,811, the disclosure of which is incorporated by reference herein to the extent it is not inconsistent with the present disclosure.

Additional sets of optical layers, similar to or different from the first and second optical layers 12, 14, may also be used in the multilayered polymer film 10. The design principles disclosed herein for the sets of first and second optical layers may be applied to any additional sets of optical layers. Furthermore, it will be appreciated that, although only a single stack 16 is illustrated in FIG. 1, the multilayered polymer film 10 may be made from multiple stacks that are subsequently combined to form the film 10.

The optical layers 12, 14 and, optionally, one or more of the non-optical layers 18 are typically placed one on top of the other to form a stack 16 of layers. Usually the optical layers 12, 14 are arranged as alternating pairs, as shown in FIG. 1, to form a series of interfaces between layers with different optical properties. The optical layers 12, 14 can be less than 1 µm thick, although thicker layers may be used. Furthermore, although FIG. 1 shows only six optical layers 12, 14, many multilayered polymer films 10 have a large number of optical layers. In some embodiments, multilayered polymer films have about 2 to 5000 optical layers, or about 25 to 2000 optical layers, or about 50 to 1500 optical layers, or about 75 to 1000 optical layers, as desired.

The non-optical layers 18 can be polymer layers that are disposed within (see FIG. 2) and/or over (see FIG. 1) the stack 16 to protect the optical layers 12, 14 from damage, to aid in the co-extrusion processing, and/or to enhance post-processing mechanical properties. The non-optical layers 18 can be thicker than the optical layers 12, 14. The thickness of the non-optical layers 18 can be at least two times, or at least four times, or at least ten times, the thickness of the individual optical layers 12, 14, but it can also be any thickness suitable for a particular application. For example, the thickness of the non-optical layers 18 may be varied to make a multilayer polymer film 10 having a particular thickness. In some embodiments, one or more of the non-optical layers 18 are placed so that at least a portion of the light to be transmitted, polarized, and/or reflected by the optical layers 12, 14, also travels through the non-optical layers (i.e., the non-optical layers are placed in the path of light which travels through or is reflected by the optical layers 12, 14).

The optical layers 12, 14 and the non-optical layers 18 of the multilayered polymer film 10 can be composed of polymers such as polyesters. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The term "polymer" will be understood to include both polymers and copolymers, as well as polymers or copolymers which may be formed in a miscible blend, for example, by coextrusion or by reaction, including, for example, transesterification.

Suitable carboxylate monomer molecules for use in forming the carboxylate subunits of the polyester layers include, for example, 2,6-naphthalene dicarboxylic acid and isomers thereof; terephthalic acid; isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid, tri-mellitic acid, sodium sulfonated isophthalic acid; 4,4-biphenyl dicarboxylic acid and isomers thereof; and lower alkyl esters of these acids, such as methyl or ethyl esters. The term "lower alkyl" refers, in this context, to $C_1$-$C_{10}$ straight-chained or branched alkyl groups. Also included within the term "polyester" are polycarbonates which are derived from the reaction of glycol monomer molecules with esters of carbonic acid, and blends of polycarbonates with copolyesters made from the above comonomers.

Tertiary butyl isophthalate (tbia) has surprisingly been found useful for some exemplary embodiments of the present disclosure due to the inverse effect it has on the polymer properties of glass transition temperature and refractive index. Increasing the mol portion of tbia can increase the glass transition temperature of the copolymer while at the same time decrease its refractive index.

Suitable glycol monomer molecules for use in forming glycol subunits of the polyester layers include ethylene glycol; propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; 2-butyl-2-ethyl-1,3-propane diol; 2,2,4-triethyl-1,3-pentane diol; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

1,4-cyclohexane dimethanol (chdm) also has been found useful for some exemplary embodiments of the present disclosure due to the inverse effect it has on the polymer properties of glass transition temperature and refractive index. Increasing the mol portion of chdm can increase the glass transition temperature of the copolymer while at the same time decrease its refractive index. In particular, copolyesters containing both tbia and chdm were found to have relatively high glass transition temperatures for their respective refractive indices.

The first optical layers 12 can be orientable polymer films, such as polyester films, which may be made birefringent by, for example, stretching the first optical layers 12 in a desired direction or directions. The term "birefringent" means that the indices of refraction in orthogonal x, y, and z directions are not all the same. For films or layers in a film, a convenient choice of x, y, and z axes is shown in FIG. 1 in which the x and y axes correspond to the length and width of the film or layer and the z axis corresponds to the thickness of the layer or film. In the embodiment illustrated in FIG. 1, the film 10 has several optical layers 12, 14 which are stacked one on top of the other in the z-direction.

The first optical layers 12 may be uniaxially-oriented, for example, by stretching in a single direction. Typically, stretching in one film in-plane direction causes drawdown in at least one other orthogonal direction, usually the thickness direction of the film, to preserve approximate volume conservation (as corrected by density changes, e.g. due to crystallization) upon stretching. In one embodiment, the direction of stretching substantially corresponds to either the x or y in-plane axis shown in FIG. 1. However, other directions may be chosen. In one illustrative embodiment of a uniaxial stretch, the film is stretched in one direction and the film contracts in two orthogonal directions to this stretch direction, e.g. in the non-drawn (or non-stretched) in-plane direction and the thickness direction. When the relative amount of contraction is similar in these directions, the first optical layers 12 attain relatively similar refractive indices in these directions perpendicular to stretch. Likewise, the maximum birefringence of the first optical layers 12 measured in this plane normal to the stretch direction is small relative to the main in-plane birefringence of these same first optical layers 12. The first optical layers 12 are then truly or nearly truly uniaxially oriented. One useful method to achieve such orientation is described in U.S. Patent Application Publications US2004/0099992 and US2002/0190406, the disclosures of which are incorporated by reference herein to the extent they are not inconsistent with the present disclosure. Another useful method is described in U.S. Pat. No. 6,609,795, the disclosure of which is incorporated by reference herein to the extent it is not inconsistent with the present disclosure. In any case, a birefringent, uniaxially-oriented layer typically exhibits a difference between the transmission and/or reflection of incident light rays having a plane of polarization parallel to the oriented direction (i.e., stretch direction) and light rays having a plane of polarization parallel to a transverse direction (i.e., a direction orthogonal to the stretch direction). For example, when an orientable polyester film is stretched along the x axis, the typical result is that $n_x \neq n_y$, or $n_x \neq n_z$ where $n_x$, $n_z$, and $n_y$ are the indices of refraction for light polarized in a plane parallel to the "x," "z" and "y" axes, respectively. The degree of alteration in the index of refraction along the stretch direction will depend on factors such as the amount of stretching, the stretch rate, the temperature of the film during stretching, the thickness of the film, the variation in the film thickness, and the composition of the film. In some embodiments, the first optical layers 12 have a maximum in-plane birefringence (e.g., the absolute value of $n_x$-$n_y$ in the absence of shearing rotation or bowing during stretching) after orientation of 0.04 or greater at 632.8 nm, or about 0.1 or greater, or about 0.2 or greater. In some embodiments of nearly truly uniaxially oriented films, the maximum birefringence in the plane normal to the stretch (the absolute value of $n_y$-$n_z$) of the first optical layers 12 is 0.03 or less at 632.8 nm, 0.02 or less or even 0.01 or less. For a nearly truly uniaxial orientation, the ratio of the maximum birefringence in the plane normal to the stretch to the maximum in-plane birefringence is 0.2 or less, or 0.15 or less, although values of 0.1 or less, or even 0.05 or less, can be achieved. All birefringence and index of refraction values herein are reported for 632.8 nm light unless otherwise indicated.

The birefringence of a material can be increased by increasing the molecular orientation. Many birefringent materials are crystalline or semicrystalline. The term "crystalline" will be used herein to refer to both crystalline and semicrystalline materials. PEN and other crystalline polyesters, such as polybutylene naphthalate (PBN), polypropylene naphthalate (PPN), polyhexamethylene naphthalate (PHN), polyethylene terephthalate (PET), polybutylene terephthalate (PBT), polypropylene terephthalate (PPT), and polyhexamethylene terephthalate (PHT) are examples of crystalline materials useful in the construction of birefringent film layers, such as is often the case for the first optical layers 12. In addition, some copolymers of PEN, PPN, PBN, PHN, PET, PPT, PBT, and PHT are also crystalline or semicrystalline. The addition of a comonomer to PEN, PPN, PBN, PHN, PET, PPT, PBT, or PHT may enhance other properties of the material including, for example, adhesion to the second optical layers 14 or the non-optical layers 18 and/or the lowering of the working temperature (i.e., the temperature for extrusion and/or stretching the film), as desired.

In some embodiments, the first optical layers 12 are made from a semicrystalline, birefringent polyester or copolyester which, in some exemplary embodiments, can include 70 to 100 mol % of a first carboxylate subunit and 0 to 30 mol % of comonomer carboxylate subunits. The comonomer carboxylate subunits may be one or more of the subunits indicated hereinabove. In some embodiments, first carboxylate subunits include naphthalate and terephthalate.

If the polyester material of the first optical layers 12 contains more than one type of carboxylate subunit, then the polyester may be a block copolyester to enhance adhesion to other layers (e.g., the second optical layers 14 or non-optical layers 18) made from block copolymers having similar blocks. Random copolyesters may also be used.

In other embodiments, the first optical layers 12 are made from a semicrystalline, birefringent polyester or copolyester which includes 70 to 100 mol % of a first glycol subunit and 0 to 30 mol % of comonomer glycol subunits. The comonomer glycol subunits may be one or more of the subunits indicated hereinabove. In some embodiments, first glycol subunits are derived from $C_2$-$C_8$ diols.

Yet other embodiments include first optical layers 12 where both of the carboxylate and glycol subunits include comonomer subunits. For these embodiments, at least 0.5 mol %, or at least 2.5 mol %, of the combined carboxylate and glycol subunits are comonomer carboxylate subunits, comonomer glycol subunits, or a combination thereof.

In some embodiments, a multilayered polymer film 10 may be formed using first optical layers 12 that are made from a coPEN which has the same in-plane birefringence for a given draw ratio (i.e., the ratio of the length of the film in the stretch direction after stretching and before stretching) as a similar multilayered polymer film formed using PEN for the first optical layers. The matching of birefringence values may be accomplished by the adjustment of processing parameters, such as the processing or stretch temperatures or the processing or stretch rates. Often coPEN optical layers have an index of refraction in the draw direction which is at least 0.02 units less than the index of refraction of the PEN optical layers in the draw direction. The birefringence is maintained because there is a decrease in the index of refraction in a non-draw direction.

In some embodiments, PEN often has an in-plane index of refraction that is 1.84 or higher and the difference between the in-plane indices of refraction is about 0.22 to 0.24 or more when measured using 632.8 nm light. The in-plane refractive index differences, or birefringence, of the first optical layers, whether they be PEN or coPEN, may be reduced to less than 0.2 to improve properties, such as interlayer adhesion. Similar comparisons between suitable coPBN and coPET polymers for the first layers can be made with PBN and PET.

The second optical layers 14 may be made from a variety of polymers. The second optical layers 14 can be made from a variety of copolymers of polyesters (i.e., copolyesters.) Illustrative copolyesters useful in the second optical layers 14 include, coPEN, coPET and co-TBIA copolymers, for example.

In some embodiments, the second optical layers 14 are uniaxially or biaxially orientable. However, more typically the second optical layers 14 are not oriented under the processing conditions used to orient the first optical layers 12. These second optical layers 14 typically retain a relatively isotropic index of refraction, even when stretched. Preferably, the second optical layers have a birefringence (e.g., $|n_x-n_y|$ or $|n_x-n_z|$) of less than about 0.04 or less than about 0.02 at 632.8 nm.

One illustrative copolyester useful for forming the second optical layers is a coPEN polymer. The coPEN polymers of the present disclosure have low in-plane indices of refraction (e.g., $n_x$ or $n_y$, or both) while maintaining relatively high glass transition temperatures. Some illustrative coPEN polymers have in-plane indices of refraction that are less than 1.59, for example, 1.58 or less, with a glass transition temperature of 90 degrees Celsius or greater, 100 degrees Celsius or greater, or 102 degrees Celsius or greater. Other illustrative coPEN polymers have in-plane indices of refraction of 1.57 or less with a glass transition temperature of 90 degrees Celsius or greater, or 1.56 or less with a glass transition temperature values of 80 degrees Celsius or greater.

In some embodiments, these coPEN copolymers include carboxylate subunits which are derived from 10 to 50 mol % naphthalate dicarboxylate and 30 to 90 mol % t-butyl-isophthalic acid (TBIA) or an ester thereof and terephthalate may optionally be present up to 50 mol % or 0 to 50 mol %. Higher refractive indices and higher glass transition temperature can be achieved by increasing the naphthalate dicarboxylate content.

The coPEN copolymers also include glycol subunits which are derived from, in some embodiments, 10 to 90 mol % cycloaliphatic diol, and 10 to 90 mol % branching diol and 1,2 ethane diol may be optionally present up to 10 mol % or 1-10 mol %. Branching diols include, for example, neopentyl glycol, 2-butyl-2-ethyl-1,3-propane diol, 2,2,4-triethyl pentane diol, and bisphenol A. In some embodiments, these coPEN copolymers include glycol subunits which are derived from 15 to 85 mol % cycloaliphatic diol, and 15 to 85 mol % branching diol. Cycloaliphatic diol refers to an alicyclic diol. Examples include, cyclohexane diols, and cyclopentane diols. One illustrative cycloaliphatic diol is 1,4-cyclohexane dimethanol.

The coPEN copolymers also can include carboxylate or glycol subunits that have more than two functional groups. In some embodiments, the coPEN includes 0.01 to 2.5 mol % of carboxylate or glycol subunits derived from compounds having three or more carboxylate or ester functionalities, three or more hydroxyl functionalities, or a combination thereof. These comonomer materials include, for example, trimethylol propane, tri-mellitic acid, and pentaerythritol. These comonomers may be distributed randomly in the coPEN polyester or they may form one or more blocks in a block copolymer. The addition of these comonomer subunits derived from compounds with three or more carboxylate, ester, or hydroxy functionalities may also decrease the birefringence of the copolyester of the second layers. These compounds can crosslink with other polymer molecules. In some embodiments of the invention, the copolyester of the second layer includes 0.01 to 5 mol %, or 0.1 to 2.5 mol %, of these compounds.

One illustrative example of a coPEN has carboxylate subunits derived from 35 to 45 mol % naphthalate dicarboxylate and 40 to 50 mol % TBIA, and 10-20 mol % terephthalate; and glycol subunits derived from 50 to 70 mol % 1,4-cyclohexane dimethanol and 20 to 40 mol % neopentyl glycol, and 5-30 mol % 1,2 ethane diol. This illustrative coPEN has a refractive index of 1.56-1.58 and a glass transition temperature (Tg) of 100 to 105 degrees Celsius. Other exemplary coPEN polymers can be produced with a Tg of 106 to 107 degrees Celsius that have a refractive index of about 1.58. Such higher Tgs can be achieved, for example, by increasing the naphthalate dicarboxylate content.

Another illustrative copolyester useful for forming the second optical layers is a coPET polymer. These coPET polymers have low in-plane indices of refraction (e.g., $n_x$ or $n_y$ or both) with relatively high glass transition temperature values. Some illustrative coPET polymers has in-plane indices of refraction that are 1.55 or less with a Tg of 80 degrees Celsius or greater, or 1.54 or less with a Tg of 70 degrees Celsius or greater, or 1.53 or less with a glass transition temperature values of 60 degrees Celsius or greater. For example, illustrative coPET polymers of the present disclosure can be produced with a Tg of about 75 degrees Celsius that have a refractive index of about 1.53. Such higher Tgs can be achieved, for example, by increasing the TBIA content. Increasing terephthalate content also increases Tg while also increasing the refractive index.

In some embodiments, these coPET copolymers include carboxylate subunits which are derived from 10 to 50 mol % dimethyl terephthalate, 20 to 50 mol % cycloaliphatic dicarboxylate, and 20 to 60 mol % t-butyl-isophthalic acid (TBIA) or an ester thereof. In other embodiments, these coPET copolymers include carboxylate subunits which are derived from 15 to 45 mol % dimethyl terephthalate, 25 to 45 mol % cycloaliphatic dicarboxylate, and 25 to 55 mol % TBIA or an ester thereof.

The coPET copolymers also include glycol subunits which are derived from, in some embodiments, 10 to 90 mol % cycloaliphatic diol, and 10 to 90 mol % branching diol and 1,2 ethane diol may be optionally present up to 10 mol % or 1-10 mol %. Branching diols include, for example, neopentyl glycol, 2-butyl-2-ethyl-1,3-propane diol, 2,2,4-triethyl pentane diol, and bisphenol A. In other embodiments, these coPEN copolymers include glycol subunits which are derived from 15 to 85 mol % cycloaliphatic diol, and 15 to 85 mol % branching diol. Cycloaliphatic diol refers to an alicyclic diol. Examples include, cyclohexane diol, and cyclopentane diol. One illustrative cycloaliphatic diol is dimethyl cyclohexane diol.

The coPET copolymers also can include carboxylate or glycol subunits that have more than two functional groups. In some embodiments, the coPET includes 0.01 to 2.5 mol % of carboxylate or glycol subunits derived from compounds having three or more carboxylate or ester functionalities, three or more hydroxyl functionalities, or a combination thereof. These comonomer materials include, for example, trimethylol propane, trimellitic acid, and pentaerythritol. These comonomers may be distributed randomly in the coPET polyester or they may form one or more blocks in a block copolymer. The addition of these comonomer subunits derived from compounds with three or more carboxylate, ester, or hydroxy functionalities may also decrease the birefringence of the copolyester of the second layers. These compounds can crosslink with other polymer molecules. In some embodiments of the invention, the copolyester of the second layer includes 0.01 to 5 mol %, or 0.1 to 2.5 mol %, of these compounds.

One illustrative example of a coPET has carboxylate subunits derived from 10 to 40 mol % dimethyl terephthalate, 30 to 45 mol % cycloaliphatic dicarboxylate, and 30 to 45 mol % TBIA; and glycol subunits derived from 20 to 80 mol % 1,4-cyclohexane dimethanol and 20 to 80 mol % neopentyl glycol, and 5-50 mol % 1,2 ethane diol. This illustrative coPET has a refractive index of 1.53 to 1.54 and a glass transition temperature of 60 to 70 degrees Celsius. Other illustrative coPET polymers of the present disclosure can be produced, for example, with a Tg of about 75 degrees Celsius that have a refractive index of about 1.53. Such higher Tgs can be achieved, for example, by increasing the TBIA content. Increasing terephthalate content also increases Tg while also increasing the refractive index.

Another type of useful copolyester for forming the second optical layers is a copolyester having cyclohexane dicarboxylate subunits and TBIA subunits and is referred to as "coTBIA." These coTBIA polymers have low in-plane indices of refraction (e.g., $n_x$ or $n_y$ or both) that are 1.53 or less with a glass transition temperature (Tg) of greater than 60 degrees Celsius, or 1.52 or less with a glass transition temperature of 55 degrees Celsius, or 1.51 or less with a glass transition temperature value of 50 degrees Celsius or greater.

In some embodiments, these coTBIA copolymers include carboxylate subunits which are derived from 30 to 70 mol % cycloaliphatic dicarboxylate, and 30 to 70 mol % TBIA or an ester thereof. In other embodiments, these coTBIA copolymers include carboxylate subunits which are derived from 40 to 60 mol % cycloaliphatic dicarboxylate, and 40 to 60 mol % TBIA or an ester thereof.

The coTBIA copolymers also include glycol subunits which are derived from, in some embodiments, 10 to 90 mol % cycloaliphatic diol, and 10 to 90 mol % branching diol and 1,2 ethane diol may be optionally present up to 10 mol % or 1-10 mol %. Branching diols include, for example, neopentyl glycol, 2-butyl-2-ethyl-1,3-propane diol, 2,2,4-triethyl pentane diol. In other embodiments, these coTBIA copolymers include glycol subunits which are derived from 20 to 80 mol % cycloaliphatic diol, and 20 to 80 mol % branching diol. Cycloaliphatic diol refers to an alicyclic diol. Examples include, cyclohexane diol, and cyclopentane diols. One illustrative cycloaliphatic diol is 1,4-dimethyl cyclohexane dimethanol.

The coTBIA copolymers also can include carboxylate or glycol subunits that have more than two functional groups. In some embodiments, the coTBIA copolymers include 0.01 to 2.5 mol % of carboxylate or glycol subunits derived from compounds having three or more carboxylate or ester functionalities, three or more hydroxyl functionalities, or a combination thereof. These comonomer materials include, for example, trimethylol propane, trimellitic acid, and pentaerythritol. These comonomers may be distributed randomly in the coPEN polyester or they may form one or more blocks in a block copolymer. The addition of these comonomer subunits derived from compounds with three or more carboxylate, ester, or hydroxy functionalities may also decrease the birefringence of the copolyester of the second layers. These compounds crosslink with other polymer molecules. In some embodiments of the invention, the copolyester of the second layer includes 0.01 to 5 mol %, or 0.1 to 2.5 mol %, of these compounds.

One illustrative example of a coTBIA copolymer has carboxylate subunits derived from 40 to 60 mol % dimethyl cyclohexane dicarboxylate, and 40 to 60 mol % TBIA; and glycol subunits derived from 30 to 70 mol % 1,4-cyclohexane dimethanol and 30 to 70 mol % branching diol. This illustrative coTBIA has a relatively low refractive index of 1.51-1.52 and a relatively high glass transition temperature of 60 to 70 degrees Celsius. Other illustrative coTBIA polymers of the present disclosure can be produced, for example, with a Tg of about 73 degrees Celsius that have a refractive index of about 1.53 or with a Tg of about 67 degrees Celsius that have a refractive index of about 1.52. Such higher Tgs can be achieved, for example, by increasing the TBIA content.

Another copolyester useful for forming the second optical layers and non-optical skin layers is a blend of a copolyester and polycarbonate such as, for example, a cyclo-aliphatic copolyester (such as, coPET) and polycarbonate which can transesterify into a new cyclo-aliphatic copolyester containing bisphenol A. These copolyester-carbonates have low in-plane indices of refraction (i.e., $n_x$ or $n_y$, or both) that are 1.57 or less with a Tg greater than 100 degrees Celsius, or greater than 105 degrees Celsius, or greater than 110 degrees Celsius. One such copolyester is commercially available from GE Plastics under the trademark Xylex, and another is commercially available from Eastman Chemical under the trademark SA115. In some embodiments, additional polycarbonate can be blended with either Xylex or SA115 to increase the polymer blend Tg for improved dimensional stability.

Still another useful copolyester useful for forming the second optical layers and non-optical skin layers is a blend of a cyclo-aliphatic CoPEN and polycarbonate which can transesterify into a new cyclo-aliphatic copolyester containing bisphenol A. These coPEN polymers have low in-plane indices of refraction (i.e., $n_x$ or $n_y$, or both) that are 1.64 or less with a Tg greater than 110 degrees Celsius. In some embodiments, the polymer blend of a copolyester and polycarbonate contains at least 20 mol % polycarbonate.

The non-optical layers 18 may also be made from copolyesters similar to the first or second optical layers 12, 14 using similar materials and similar amounts of each material. The polyesters of the first optical layers 12, the second optical layers 14, and the non-optical layers 18 can be chosen to have similar rheological properties (e.g., melt viscosities) so that they can be co-extruded. The second optical layers 14 and the non-optical layers 18 can have a glass transition temperature, Tg, that is either below or no greater than about 40° C. above the glass transition temperature of the first optical layers 12. Preferably, the glass transition temperature of the second optical layers 14 and the non-optical layers 18 is below the glass transition temperature of the first optical layers 12.

Figure 3:
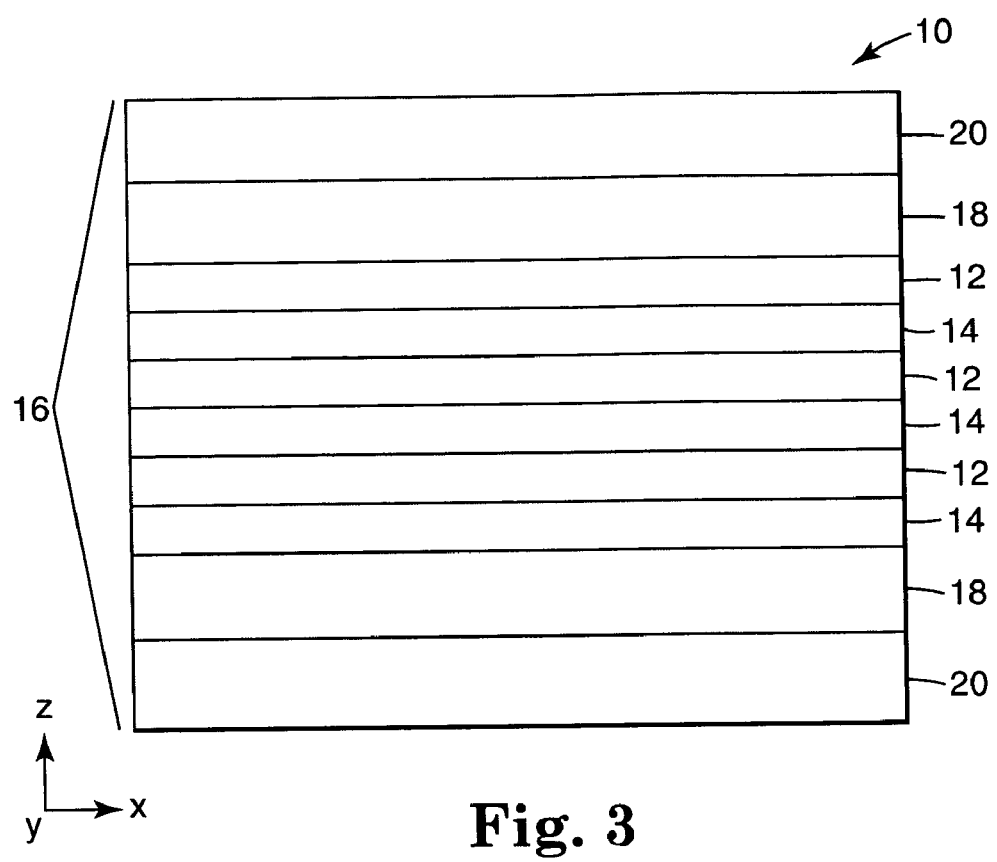
FIG. 3 is a schematic cross-sectional view of another embodiment of a multilayered polymer film according to the present invention.

FIG. 3 shows one illustrative embodiment having non-optical skin layers 20 disposed on the non-optical layers 18. Non-optical skin layers 20 can comprise blends of cyclo-aliphatic copolyester/polycarbonates and immiscible polymers which form discrete minor phase particles to create haze or light scattering centers for hiding cosmetic defects in the optical film. The immiscible polymer minor phase particles can have a refractive index match with the cyclo-aliphatic/polycarbonate major phase, in which case they create haze by generating surface roughness in the non-optical skin layers. Examples of immiscible polymer minor phase particles having a similar refractive index to the cyclo-aliphatic copolyesters include; polystyrene and styrene acrylo-nitrile, styrene-acrylate copolymers, and other styrene copolymers; copolyesters such as CoPEN-tbia and PETG. Alternatively, the refractive index of the immiscible polymer minor phase particles can differ from the refractive index of the major phase cyclo-aliphatic copolyester/polycarbonate and thus generate bulk light scattering or diffusion in the non-optical skin layers 20. Examples of immiscible polymer minor phase particles include; polymethyl methacrylate(PMMA), acyrilonitrile butadiene styrene(ABS), polyamides, polyimides, and olefins such as polyethylene, polyethylene copolymer, polypropylene, and polypropylene copolymers.

A polarizer may be made by combining a uniaxially-oriented first optical layer 12 with a second optical layer 14 having an isotropic index of refraction that is approximately equal to one of the in-plane indices of the oriented layer. Alternatively, both optical layers 12, 14 can be formed from birefringent polymers and are oriented in a multiple draw process so that the indices of refraction in a single in-plane direction are approximately equal. The interface between the two optical layers 12, 14, in either case, forms a light reflection plane. Light polarized in a plane parallel to the direction in which the indices of refraction of the two layers are approximately equal will be substantially transmitted. Light polarized in a plane parallel to the direction in which the two layers have different indices will be at least partially reflected. The reflectivity can be increased by increasing the number of layers or by increasing the difference in the indices of refraction between the first and second layers 12, 14.

Typically, the highest reflectivity for a particular interface occurs at a wavelength corresponding to twice the combined optical thickness of the pair of optical layers 12, 14 which form the interface. The optical thickness of the two layers is $n_1 d_1 + n_2 d_2$ where $n_1$, $n_2$ are the indices of refraction of the two layers and $d_1$, $d_2$ are the thicknesses of the layers. The layers 12, 14 may each be a quarter wavelength thick or the layers 12, 14 may have different optical thicknesses, so long as the sum of the optical thicknesses is half of a wavelength (or a multiple thereof). A film having a plurality of layers may include layers with different optical thicknesses to increase the reflectivity of the film over a range of wavelengths. For example, a film may include pairs of layers which are individually tuned to achieve optimal reflection of light having particular wavelengths.

Alternatively, the first optical layers 12 may be biaxially-oriented by stretching in two different directions. The stretching of optical layers 12 in the two directions may result in a net symmetrical or asymmetrical stretch in the two chosen orthogonal axes.

One example of the formation of a mirror is the combination of a biaxially-oriented optical layer 22 with a second optical layer 24 having indices of refraction which differ from both the in-plane indices of the biaxially-oriented layer. The mirror operates by reflecting light having either polarization because of the index of refraction mismatch between the two optical layers 12, 14. Mirrors may also be made using a combination of uniaxially-oriented layers with in-plane indices of refraction which differ significantly. In another embodiment, the first optical layers 12 are not birefringent and a mirror is formed by combining first and second optical layers 12, 14 which have significantly different indices of refraction. Reflection occurs without orientation of the layers. There are other methods and combinations of layers that are known for producing both mirrors and polarizers and which may be used. Those particular combinations discussed above are merely exemplary.

The second optical layers 14 may be prepared with a variety of optical properties depending, at least in part, on the desired operation of the film 10. In one embodiment, the second optical layers 14 are made of a polymer material that does not appreciably optically orient when stretched under conditions which are used to orient the first optical layers 12. Such layers are particularly useful in the formation of reflective polarizing films, because they allow the formation of a stack 16 of layers by, for example, coextrusion, which can then be stretched to orient the first optical layers 12 while the second optical layers 14 remain relatively isotropic. Typically, the index of refraction of the second optical layers 14 is approximately equal to one of the indices of the oriented first optical layers 12 to allow transmission of light with a polarization in a plane parallel to the direction of the matched indices. Preferably, the two approximately equal indices of refraction differ by about 0.05 or less, and more preferably by about 0.02 or less, at 632.8 nm. In one embodiment, the index of refraction of the second optical layers 14 is approximately equal to the index of refraction of the first optical layers 12 prior to stretching.

In other embodiments, the second optical layers 14 are orientable. In some cases, the second optical layers 14 have one in-plane index of refraction that is substantially the same as the corresponding index of refraction of the first optical layers 12 after orientation of the two sets of layers 12, 14, while the other in-plane index of refraction is substantially different than that of the first optical layers 12. In other cases, particularly for mirror applications, both in-plane indices of refraction of the optical layers 12, 14 are substantially different after orientation.

Figure 2:
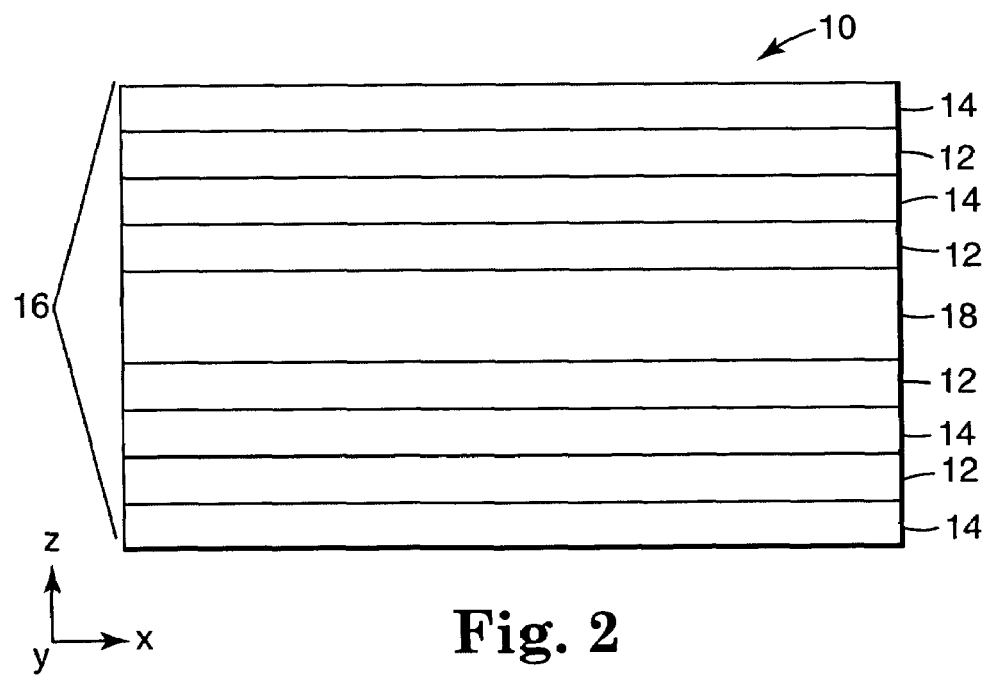
FIG. 2 is a schematic cross-sectional view of another embodiment of a multilayered polymer film according to the present invention.

Referring again to FIGS. 1 and 2, one or more of the non-optical layers 18 may be formed as a skin layer over at least one surface of stack 16 as illustrated in FIG. 1, to, for example, protect the optical layers 12, 14 from physical damage during processing and/or afterwards. In addition, one or more of non-optical layers 18 may be formed within the stack 16 of layers, as illustrated in FIG. 2, to, for example, provide greater mechanical strength to the stack or to protect the stack during processing.

One or more strippable skin layers can be provided over the non-optical layers 18 and/or non-optical skin layers 20. These strippable skin layers can be used to protect the underlying optical body during storage and shipping. The strippable skin layers can be removed prior to use of the multilayer film. The strippable skin layers can be disposed onto the multilayer film by coating, extrusion, or other suitable methods or can be formed by coextrusion or other suitable methods with the multilayer film. The strippable skin layer can be adhered to the multilayer film using an adhesive, although in some embodiments, no adhesive is necessary. The strippable skin layers can be formed using an,, protective polymer material than has sufficient adherence (with or without adhesive as desired) to the multilayer film so that the strippable skin layer will remain in place until the strippable skin layer is removed manually or mechanically. Suitable materials include, for example, low melting and low crystallinity polyolefins such as copolymers of syndiotactic polypropylene (for example, Finaplas 1571 from Atofina), copolymers of propylene and ethylene (for example, PP8650 from Atofina), or ethylene octene copolymers (for example, Affinity PT 1451 from Dow). Optionally, a mixture of polyolefin materials can be utilized for the strippable skin layer. Preferably, when the strippable skin layer is removed there will be no remaining material from the strippable skin layer or any associated adhesive, if used. In some embodiments, the strippable skin layer can have a thickness of at least 12 micrometers.

The non-optical layers 18 ideally do not significantly participate in the determination of optical properties of the multilayered polymer film 10, other than haze generation, at least across the wavelength region of interest. The non-optical layers 18 are typically not birefringent or orientable but in some cases this may not be true. Typically, when the non-optical layers 18 are used as skin layers there will be at least some surface reflection. If the multilayered polymer film 10 is to be a polarizer, the non-optical layers preferably have an index of refraction which is relatively low. This decreases the amount of surface reflection. If the multilayered polymer film 10 is to be a mirror, the non-optical layers 18 preferably have an index of refraction which is high, to increase the reflection of light.

When the non-optical layers 18 are found within the stack 16, there will typically be at least some polarization or reflection of light by the non-optical layers 18 in combination with the optical layers 12, 14 adjacent to the non-optical layers 18. Typically, however, the non-optical layers 18 have a thickness which dictates that light reflected by the non-optical layers 18 within the stack 16 has a wavelength outside the region of interest, for example, in the infrared region for visible light polarizers or mirrors.

A brief description of one method for forming multilayer polymer films is provided below. A fuller description of other exemplary process conditions and considerations can be found in U.S. patent application Ser. No. 09/006,288 entitled "Process for Making Multilayer Optical Film." The multilayer polymer films are formed by extrusion of polymers to be used in the first and second optical layers, as well as the non-optical layers. Extrusion conditions are chosen to adequately feed, melt, mix and pump the polymer resin feed streams in a continuous and stable manner. Final melt stream temperatures are chosen to be within a range which reduces freezing, crystallization or unduly high pressure drops at the low end of the range and which reduces degradation at the high end of the range. The entire melt stream processing of more than one polymer, up to and including film casting on a chill roll, is often referred to as co-extrusion.

Following extrusion, each melt stream is conveyed through a neck tube into a gear pump used to regulate the continuous and uniform rate of polymer flow. A static mixing unit may be placed at the end of the neck tube to carry the polymer melt stream from the gear pump into a multilayer feedblock with uniform melt stream temperature. The entire melt stream is typically heated as uniformly as possible to enhance both uniform flow of the melt stream and reduce degradation during melt processing.

Multilayer feedblocks divide each of two or more polymer melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow is often controlled by choices made in machinery, as well as the shape and physical dimensions of the individual side channel tubes and layer slots.

The side channel tubes and layer slots of the two or more melt streams are often interleaved to, for example, form alternating layers. The feedblock's downstream-side manifold is often shaped to compress and uniformly spread the layers of the combined multilayer stack transversely. Thick, non-optical layers, known as protective boundary layers (PBLs), may be fed near the manifold walls using the melt streams of the optical multilayer stack, or by a separate melt stream. As described above, these non-optical layers may be used to protect the thinner optical layers from the effects of wall stress and possible resulting flow instabilities.

The multilayer stack exiting the feedblock manifold may then enter a final shaping unit such as a die. Alternatively, the stream may be split, preferably normal to the layers in the stack, to form two or more multilayer streams that may be recombined by stacking. The stream may also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal streams widths (i.e., multiplier ratios greater than unity) can be useful in creating layer thickness gradients. In the case of unequal stream widths, the multiplier may spread the narrower stream and/or compress the wider stream transversely to the thickness and flow directions to ensure matching layer widths upon stacking.

Prior to multiplication, additional non-optical layers can be added to the multilayer stack. These non-optical layers may perform as PBLs within the multiplier. After multiplication and stacking, some of these layers may form internal boundary layers between optical layers, while others form skin layers.

After multiplication, the web is directed to the final shaping unit. The web is then cast onto a chill roll, sometimes also referred to as a casting wheel or casting drum. This casting is often assisted by electrostatic pinning, the details of which are well-known in the art of polymer film manufacture. The web may be cast to a uniform thickness across the web or a deliberate profiling of the web thickness may be induced using die lip controls.

The multilayer web is then drawn to produce the final multilayer optical film. In one exemplary method for making a multilayer optical polarizer, a single drawing step is used. This process may be performed in a tenter or a length orienter. Typical tenters draw transversely (TD) to the web path, although certain tenters are equipped with mechanisms to draw or relax (shrink) the film dimensionally in the web path or machine direction (MD). Thus, in this exemplary method, a film is drawn in one in-plane direction. The second in-plane dimension is either held constant as in a conventional tenter, or is allowed to neck in to a smaller width as in a length orienter. Such necking in may be substantial and increase with draw ratio.

In one exemplary method for making a multilayer mirror, a two step drawing process is used to orient the birefringent material in both in-plane directions. The draw processes may be any combination of the single step processes described that allow drawing in two in-plane directions. In addition, a tenter that allows drawing along MD, e.g. a biaxial tenter which can draw in two directions sequentially or simultaneously, may be used. In this latter case, a single biaxial draw process may be used.

In still another method for making a multilayer polarizer, a multiple drawing process is used that exploits the different behavior of the various materials to the individual drawing steps to make the different layers comprising the different materials within a single coextruded multilayer film possess different degrees and types of orientation relative to each other. Mirrors can also be formed in this manner.

The intrinsic viscosity of the polyesters used in these layers and films is related to the molecular weight (in the absence of branching monomers) of the polymer. In some embodiments, the polyesters have an intrinsic viscosity of greater than about 0.4 dL/g, or between about 0.4 to 0.9 dL/g. Intrinsic viscosity, for purposes of this disclosure, is measured in a 60/40 wt. % phenol/o-dichlorobenzene solvent at 30° C. unless otherwise indicated.

The following examples demonstrate the manufacture and uses of multilayered polymer films of the invention. It is to be understood that these examples are merely illustrative and are in no way to be interpreted as limiting the scope of the invention.

EXAMPLES

Test Methods

To test for film microwrinkling, a sample of multilayer film was taken and any outer propylene polymer skin layers were removed from the film. The sample was then adhered to the non-adhesive side of a sample of adhesive-backed polarizer film (Sanritz adhesive-backed polarizer film (available from Set (HK) Ltd. of Hong Kong, People's Republic of China) using a commercially available adhesive (Soken 1885 adhesive available from Soken Chemical & Engineering Company, Ltd. of Saitama Prefecture, Japan). The construction was then applied to a piece of glass using the adhesive of the adhesive-backed polarizer to adhere the polarizer to the glass. The finished construction comprised the following layers, in order: the multilayer optical film, a layer of Soken 1885 pressure-sensitive adhesive (PSA), the polarizer film, an adhesive layer and the glass plate. This construction was heated at 85° C. and examined periodically for microwrinkling. The construction was heated at 85° C. until microwrinkling was observed or for up to 1,000 hours if microwrinkling was not observed. Microwrinkling manifests itself as objectionable haze or iridescence in the films, and when examined under a microscope at a magnification of between 50 and 200 times is observed to be a permanent deformation of optical layers or any protective outer layers. This appears as wrinkles under the surface layers or rough texture on the surface of the multilayer film.

The test for warp: Clean two 9.5"×12.5" (24.1×31.8 cm) flat pieces of double strength glass with isopropyl alcohol. A 9"×12" (22.9×30.5 cm) piece of the optical body is attached to one piece of glass on two short sides and one of the long sides, leaving the remaining long side unconstrained. To attach the optical body, first attach Double Stick Tape (3M, St. Paul, Minn.) to a piece of glass such that the tape is 0.5" (1.3 cm) from three edges of the glass and will be exactly covered by 3 sides of the optical body. Avoid overlapping the ends of the tape. Place the optical body on the tape such that the optical body is tensioned across the tape and is held above the glass surface by the thickness of the tape (about 0.1 mm). Roll the optical body down to the tape with a 4.5 lb. (2 kg) roller once in each direction, avoiding extra force.

Place three 0.1 mm thick, 0.5" (1.3 cm) wide polyethylene terephthalate (PET) shims onto the rolled optical body, the shims being exactly above the tape and of the same lengths, but on the opposite side of the optical body. Avoid overlapping the shims. Place the top piece of glass on top of the shims and exactly aligned with the bottom piece of glass.

This completes a sandwiched construction of glass-tape-optical film-shim-glass, in which the optical body is constrained at three edges and substantially free floating in the center. This construction is attached together with 4 binder clips as are commonly used to hold stacks of paper together (Binder Clips, Officemate International Corporation, Edison, N.J.). The clips should be of an appropriate size to apply pressure to the center of the tape (approximately 0.75" (1.9 cm) from the edge of the glass) and are positioned two each on the short sides of the construction, each about 0.75" (1.9 cm) away from the bottom and top of the optical body.

This completed construction is placed in a thermal shock chamber (Model SV4-2-2-15 Environmental Test Chamber, Envirotronics, Inc., Grand Rapids, Mich.) and subjected to 96 cycles, a cycle consisting of one hour at 85° C. followed by one hour at −35° C. The film is then removed from the chamber and inspected for warp. Warp is considered unacceptable when there are many deep wrinkles across the surface of the film. When there are few shallow wrinkles or the film appears smooth, warp is generally considered acceptable.

Intrinsic viscosity (IV) was measured according to ASTM D5225.

Refractive index was measured with a Metricon refractometer at a wavelength of 632 nanometers.

Materials

Monomers, catalysts and stabilizers utilized in creating polymers for these examples are commercially available from the following exemplary suppliers: dimethyl 2,6-naphthalenedicarboxylate from Amoco (Decatur, Ala.); dimethyl terephthalate from Hoechst Celanese (Dallas, Tex.); 1,4-cyclohexane dimethanol from Sigma-Aldrich (St. Louis, Mo.); neopentyl glycol from Sigma-Aldrich (St. Louis, Mo.); ethylene glycol from Union Carbide (Charleston, W. Va.); trimethylolpropane from Sigma-Aldrich; anhydrous cobalt (II) acetate from Hall Chemical (Wickliffe, Ohio); anhydrous zinc acetate from Sigma-Aldrich; antimony (III) acetate available as antimony triacetate from Elf Atochem (Philadelphia, Pa.); triethyl phosphonoacetate from Albright & Wilson (Glen Allen, Va.); tertiary butyl isophthalate from Noetic Technologies, Inc. (Hattiesburg, Miss.); phenol from Sigma-Aldrich; o-chlorophenol available as 2-chlorophenol from Sigma-Aldrich; poly(methyl methacrylate) available under the trade name of V044 from Atofina Chemicals (Philadelphia, Pa.); propylene polymer available as PP 6671 from Atofina Chemicals; propylene polymer available as PP1024 from Exxon Mobil (Houston, Tex.); polyethylene cyclohexamethylene terephthalate (PETG) is available under the trade name Eastar 6763 from Eastman Chemical Company (Kingsport, Tenn.); manganese (II) acetate from Hall Chemical; dimethyl cyclohexane dicarboxylate from Eastman Chemical Co.; PCTG is available under the trade name of ESTAR6763 from Eastman Chemical Co. A thermoplastic polyester is available under the trade name of ECDEL from Eastman Chemical Company.

Example 1

Synthesis of Polyethylene Naphthalate (PEN)

The polyethylene naphthalate (PEN) used to form the first optical layers was synthesized in a batch reactor with the following raw material charge: dimethyl naphthalene dicarboxylate (136 kg), ethylene glycol (73 kg), manganese (II) acetate (27 g), cobalt (II) acetate (27 g) and antimony (III) acetate (48 g). Under a pressure of 2 atmospheres (1520 torr or $2\times10^5$ N/m$^2$), this mixture was heated to 254° C. while removing methanol (a transesterification reaction by-product). After 35 kg of methanol was removed, 49 g of triethyl phosphonoacetate (49 g) was charged to the reactor and the pressure was gradually reduced to 1 torr (131 N/m$^2$) while heating to 290° C. The condensation reaction by-product, ethylene glycol, was continuously removed until a polymer with an intrinsic viscosity of 0.48 dL/g (as measured in 60/40 wt. % phenol/o-dichlorobenzene) was produced.

Synthesis of ethylene naphthalate t-butyl isophthalate polymer (CoPEN-tbia)

The synthesis of the CoPEN-tbia polymer was carried out in a batch reactor which was charged with the following materials: dimethyl 2,6-naphthalenedicarboxylate (47.3 kg), dimethyl terephthalate (18.6 kg), 1,4-cyclohexane dimethanol (40.5 kg), neopentyl glycol (15 kg), ethylene glycol (41.8 kg), trimethylol propane (2 kg), cobalt (II) acetate (36.3 g), zinc acetate (50 g), and antimony (III) acetate (65 g). The mixture was heated to a temperature of 254° C. at a pressure of two atmospheres ($2\times10^5$ N/m$^2$) and the mixture allowed to react while removing the methanol reaction product.

After completing the reaction and removing all of the methanol (approximately 13.1 kg) the reaction vessel was charged with tertiary-butyl isophthalate (43.2 kg). The reaction was continued at 254° C. until approximately 7.4 kg of water was removed and the reaction was complete.

The reaction vessel was charged with triethyl phosphonoacetate (70 g) and the pressure was reduced to one torr (263 N/m$^2$) while heating to 290° C. The condensation by-product, ethylene glycol, was continuously removed until a polymer with intrinsic viscosity 0.632 dl/g as measured in a 60/40 weight percent mixture of phenol and o-dichlorobenzene is produced. The CoPEN-tbia polymer produced by this method had a glass transition temperature (Tg) of 102° C. as measured by differential scanning calorimetry at a temperature ramp rate of 20° C. per minute. The CoPEN-tbia polymer had a refractive index of 1.567.

Multilayer Optical Film—PEN/CoPEN-tbia Reflective Polarizer Film

The above described PEN and CoPEN-tbia were coextruded through a multilayer melt manifold to create a multilayer optical film with 275 alternating first and second optical layers. The PEN layers were the first optical layers and the CoPEN-tbia layers were the second optical layers. In addition to the first and second optical layers, a set of non-optical layers, also comprised of CoPEN-tbia were coextruded as PBL(protective boundary layers) on either side of the optical layer stack. Two sets of skin layers were also coextruded on the outer side of the PBL non-optical layers through additional melt ports. Poly(methyl methacrylate) was used to form the internal set of skin layers. The external skin layers were made from a blend of propylene polymers (80:20 by weight respectively of PP6671 and PP1024) were used to form the external set of coextruded skin layers. The construction was, therefore, in order of layers: polypropylene mixture outer skin layer, polymethyl methacrylate inner skin layer, 275 alternating layers of optical layers one and two, polymethyl methacrylate inner skin layer, and a further polypropylene outer skin layer.

The multilayer extruded film was cast onto a chill roll at 23.5 meters per minute (77 feet per minute) and heated in an oven at 154° C. (310° F.) for 30 seconds, and then nearly truly uniaxially oriented at a 6:1 draw ratio to produce a reflective polarizer film of approximately 30 microns (1.2 mils) thickness.

This multilayer film was tested for microwrinkling—no appreciable microwrinkling was observed up to 1000 hours.

Example 2

Synthesis of PET

The polyethylene terephthalate (PET) used in the examples was made as follows: A batch reactor was charged with dimethyl terephthalate (5,000 kg), ethylene glycol (3,502 kg), manganese (II) acetate (1.2 kg), and antimony (III) acetate (1.6 kg). The mixture was heated to 254° C. at a pressure of two atmospheres (1520 torr or $2\times10^5$ N/m$^2$) while removing the transesterification by-product methanol. After 1,649 kg of methanol was removed, triethyl phosphonoacetate (2.45 kg) was added to the reactor and the pressure was gradually reduced to one torr (131 N/m$^2$) while heating to 280° C. The condensation by-product, ethylene glycol, was continuously removed until a polymer with an intrinsic viscosity of 0.60 (measured in a 60/40 phenol/dichlorobenzene mixture) was produced.

Synthesis of polyethylene terephthalate t-butyl isophthalate polymer (CoPET-tbia I)

The CoPET-tbia I used comprised sub-units derived from 1,4-dimethyl terephthalate (40 mol %), t-butyl dicarboxylate (30 mol %), dimethyl cyclohexane dicarboxylate (30 mol %); and glycol subunits derived from 1,4-cyclohexane dimethanol (60 mol %), neopentyl glycol (20 mol %), ethylene glycol (19.5 mol %) and trimethylolpropane (0.5 mol %).

The synthesis of the CoPET-tbia I polymer was carried out in a batch reactor which was charged with the following materials: dimethyl terephthalate (44 kg), 1,4-dimethyl cyclohexane dicarboxylate (33.7 kg), 1,4-cyclohexane dimethanol (47.6 kg), neopentyl glycol (11.8 kg), ethylene glycol (24.6 kg), trimethylol propane (2 kg), cobalt (II) acetate (36.3 g), zinc acetate (50 g), and antimony (III) acetate (65 g). The mixture was heated to a temperature of 254° C. at a pressure of two atmospheres ($2\times10^5$ N/m$^2$) and the mixture allowed to react while removing the methanol reaction product.

After completing the reaction and removing the methanol (approximately 25.4 kg), the reaction vessel was charged with tertiary-butyl isophthalate (37.7 kg). The reaction was continued at 254° C. and at two atmospheres ($2\times10^5$ N/m$^2$) pressure removing the reaction by-product water (a total of approximately 6.1 kg) until the reaction was complete.

The reaction vessel was charged with triethyl phosphonoacetate (70 g) and the pressure was reduced to one torr (263 N/m$^2$) while heating to 290° C. The condensation by-product, ethylene glycol, was continuously removed until a polymer with intrinsic viscosity 0.65 dl/g as measured in a 60/40 weight percent mixture of phenol and o-dichlorobenzene is produced. The CoPET-tbia I polymer produced by this method had a glass transition temperature (Tg) of about 70° C. as measured by differential scanning calorimetry at a temperature ramp rate of 20° C. per minute. The CoPET-tbia I polymer had a refractive index of 1.54 as measured with a Metricon refractometer at a wavelength of 632 nanometers.

Multilayer Optical Film—PET/CoPET-tbia I Reflective Polarizer Film

The above described PET and CoPET-tbia I can be coextruded through a multilayer melt manifold to create a multilayer optical film with 825 alternating first and second optical layers. The PET layers can be the first optical layers and the CoPET-tbia I layers can be the second optical layers. In addition to the first and second optical layers, a set of non-optical layers, also comprised of CoPET-tbia were coextruded as PBL(protective boundary layers) on either side of the optical layer stack. Two sets of skin layers were also coextruded on the outer side of the PBL non-optical layers through additional melt ports. PET can be used to form the internal set of skin layers. The external skin layers can be a blend of propylene polymers (80:20 by weight respectively of PP8650 and PP1571).

The multilayer extruded film can be cast onto a chill roll at 23.5 meters per minute (77 feet per minute) and heated in an oven at 99° C. (210° F.) for 30 seconds, and then nearly truly uniaxially oriented at a 6:1 draw ratio to produce a reflective polarizer film of approximately 30 microns (1.2 mils) thickness.

This multilayer film is intended for applications exposed to environmental conditions up to 60 degrees Celsius, and microwrinkling is not expected to occur up to that temperature within 1000 hours.

Example 3

The PET used in Example 3 was made as described in Example 2.

Synthesis of Polyethylene Terephthalate T-butyl Isophthalate Polymer (CoPET-tbia II)

The CoPET-tbia polymer used in this example, CoPET-tbia II carboxylate subunits derived from 1,4 dimethyl terephthalate (40 mol %), tertiary butyl dicarboxylic acid (30 mol %), and dimethyl cyclohexane dicarboxylate (30 mol %); and glycol subunits derived from 1,4 cyclohexane dimethanol (30 mol %), neopentyl glycol (20 mol %), ethylene glycol (49.5 mol %) and trimethylol propane (0.5 mol %).

The CoPET-tbia II was synthesized in a batch reactor which was charged with the following raw materials: 1,4 dimethyl terephthalate (7.11 kg), 1,4 dimethyl cyclohexane dicarboxylate (5.45 kg), 1,4 cyclohexane dimethanol (3.85 kg), neopentyl glycol (1.9 kg), ethylene glycol (11.36 kg), trimethylol propane (0.2 kg), cobalt (II) acetate (3.6 g), zinc acetate (5.0 g), and antimony (III) acetate (6.5 g). Under pressure of 2 atmospheres ($2\times10^5$ N/m$^2$), the mixture was heated to 254° C. while removing the reaction by-product, methanol. After completing this reaction and removing the methanol, tertiary butyl isophthalic acid (6.1 kg) was charged to the reactor. Under pressure of 2 atm, this mixture was heated to 254° C. until the reaction by-product, water, is removed. Triethyl phosphonoacetate (7.0 g) was then charged to the reactor and the pressure was gradually reduced to 1 torr (263 N/m$^2$) while heating to 290° C. The condensation by-product, ethylene glycol, was continuously removed until a polymer with intrinsic viscosity of 0.68 dl/g, as measured in 60/40 wt % phenol/o-dichlorobenzene, was produced. The polymer produced had a glass transition temperature of about 67° C. as measured by differential scanning calorimetry (DSC) at a temperature ramp of 20° C./min. This CoPET-tbia II had a refractive index of 1.535 as measured with a Metricon refractometer at 632 nm.

Multilayer Optical Film—PET/CoPET-tbia II Reflective Polarizer Film

The above described PET and CoPET-tbia II can be coextruded through a multi-layer melt manifold to create a multi-layer optical film with 825 alternating first and second optical layers. The PET can be used for the first optical layers and the CoPET-tbia II can be used for the second optical layers. In addition to the first and second optical layers, a set of skin layers can be coextruded on the outside of the optical layers through additional melt ports. PP8650 propylene polymer can be used to form the external pair of coextruded skin layers. This multilayer cast film can be cast onto a chilled wheel, and then heated in an oven charged with hot air at 99° C. for about 30 seconds, and then nearly truly uniaxially oriented, (true uniaxial orientation meaning uniaxial orientation whereby the film can be allowed to relax in the machine direction while being oriented in the transverse direction), at a 6:1 draw ratio to produce a reflective polarizer film of approximately 25 microns in thickness.

This multilayer film is intended for applications exposed to environmental conditions up to 60 degrees Celsius, and microwrinkling is not expected to occur up to that temperature within 1000 hours.

Example 4

A multi-layer reflective mirror film is constructed with first optical layers created from polyethylene terephthalate and second optical layers created from co-cyclohexane-tbia (CCH-tbia) having carboxylate subunits derived from tertiary butyl dicarboxylate (50 mol %) and dimethyl cyclohexane dicarboxylate (50 mol %); and glycol subunits derived from 1,4 cyclohexane dimethanol (50 mol %), neopentyl glycol (20 mol %), ethylene glycol (29.5 mol %), and trimethylol propane (0.5 mol %).

The polyethylene terephthalate (PET) used to form the first optical layers was synthesized as described for Examples 2 and 3.

Synthesis of Co-cyclohexane-tertiary Butyl Isophthalate Polymer (CCH-tbia) Using DMCD Synthesis of the co-cyclohexane-tbia was carried out in a batch reactor which was charged with the following raw materials: 1,4 dimethyl cyclohexane dicarboxylate (8.45 kg), 1,4 cyclohexane dimethanol (8.98 kg), neopentyl glycol (1.8 kg), ethylene glycol (7.95 kg), trimethylol propane (0.2 kg), cobalt (II) acetate (3.6 g), zinc acetate (5.0 g), and antimony (1 ml) acetate (6.5 g). Under a pressure of 2 atmospheres ($2\times10^5$ N/m$^2$), this mixture was heated to 254 C while removing the reaction by-product, methanol. After completing this reaction and removing the methanol, tertiary butyl isophthalate (9.48 kg) was charged to the reactor. Under a pressure of 2 atmospheres ($2\times10^5$ N/m$^2$), the mixture was heated to 254° C. until the reaction by-product, water, was removed. Triethyl phosphonoacetate (7.0 g) was then charged to the reactor and the pressure was gradually reduced to 1 torr (263 N/m$^2$) while heating to 290° C. The condensation by-product, ethylene glycol, was continuously removed until a polymer with intrinsic viscosity of 0.72 dl/g, as measured in 60/40 wt % phenol/o-dichlorobenzene, was produced. The polymer had a glass transition temperature of about 67° C. as measured by DSC with a temperature ramp of 20° C./min. This CCH-tbia had a refractive index of 1.519 as measured with a Metricon refractometer at 632 nm.

Alternate Synthesis of Co-cyclohexane-tertiary Butyl Isophthalate Polymer (CCH-tbia) using 1,4 CHDA Synthesis of the co-cyclohexane-tbia was carried out in a batch reactor which was charged with the following raw materials: 1,4 cyclohexane dicarboxylic acid (37 kg), tertiary butyl isophthalic acid (59.9 kg), 1,4 cyclohexane dimethanol (37.8 kg), neopentyl glycol (11.2 kg), ethylene glycol (60.3 kg), trimethylol propane (0.5 kg), and antimony (III) acetate (90 g). Under a pressure of 2 atmospheres ($2\times10^5$ N/m$^2$), this mixture was heated to 254 degrees C. while removing the reaction by-product, water. After completing this reaction and removing the water, the pressure was gradually reduced to 1 torr (263 N/m$^2$) while heating to 290° C. The condensation by-product, ethylene glycol, was continuously removed until a polymer with intrinsic viscosity of 0.72 dl/g, as measured in 60/40 wt % phenol/o-dichlorobenzene, was produced. The polymer had a glass transition temperature of about 67° C. as measured by DSC with a temperature ramp of 20° C./min. This CCH-tbia had a refractive index of 1.519 as measured with a Metricon refractometer at 632 nm.

Multilayer Optical Film—PET/CCH-tbia Mirror Film

The above described PET and CCH-tbia could be coextruded through a multi-layer melt manifold to create a multi-layer optical film with 825 alternating first and second optical layers. The first optical layers can be formed from PET and the second optical layers can be formed from the CCH-tbia. In addition to the first and second optical layers, a set of non-optical layers, comprised of the same material as the second optical layers can be coextruded as PBL (protective boundary layers) on either side of the optical layer stack. Another set of skin layers can also be coextruded on the outer side of the PBL non-optical layers through additional melt ports. The skin layers can consist of the same PET material as the PET material used for the first optical layers. This multi-layer extruded film can be cast onto a chilled wheel, and then heated in an oven charged with hot air at 99° C. for about 30 seconds, and then biaxially oriented at draw ratios of 3.5 in the machine direction and by 3.5 in the transverse direction to form a multi-layer mirror film.

This multilayer film is intended for applications exposed to environmental conditions up to 60 degrees Celsius, and microwrinkling is not expected to occur up to that temperature within 1000 hours.

Example 5

Multilayer Optical Film—CoPEN8218/Xylex Reflective Polarizer Film

A multilayer reflective polarizer film may be constructed with first optical layers created from a co(polyethylene naphthalate) and second optical layers created from cycloaliphatic polyester/polycarbonate blend commercially available from GE Plastics under the series tradename "Xylex."

The co(polyethylene naphthalate) used to form the first optical layers is synthesized in a batch reactor with the following raw material charge: 126 kg dimethyl naphthalene dicarboxylate, 11 kg dimethyl terephthalate, 75 kg ethylene glycol, 27 g manganese acetate, 27 g cobalt acetate, and 48 g antimony triacetate. Under pressure of 2 atm ($2\times10^5$ N/m$^2$), this mixture is heated to 254° C. while removing methanol. After 36 kg of methanol is removed, 49 g of triethyl phosphonoacetate is charged to the reactor and than the pressure is gradually reduced to 1 torr while heating to 290° C. The condensation reaction by-product, ethylene glycol, is continuously removed until a polymer with an intrinsic viscosity of 0.50 dL/g, as measured in 60/40 wt. % phenollo-dichlorobenzene, is produced. This co(polyethylene naphthalate) or "coPEN9010" was blended with 9 wt % PET to form "coPEN8218"

CoPEN8218 was coextruded with Xylex 7200 through a multilayer melt manifold to create a multilayer optical film with 275 alternating first and second optical layers. The CoPEN8218 layers were the first optical layers and the Xylex 7200 layers were the second optical layers. In addition to the first and second optical layers, a set of non-optical layers, also comprised of Xylex 7200 were coextruded as PBL(protective boundary layers) on either side of the optical layer stack. Two sets of skin layers were also coextruded on the outer side of the PBL non-optical layers through additional melt ports. Polypropylene 6671 was used to form the internal set of skin layers. The external skin layers were made from a blend of propylene polymers (80:20 by weight respectively of PP6671 and PP8650) were used to form the external set of coextruded skin layers. The construction was, therefore, in order of layers: polypropylene mixture outer skin layer, polypropylene inner skin layer, 275 alternating layers of optical layers one and two, polypropylene inner skin layer, and a further polypropylene mixture outer skin layer.

The multilayer extruded film was cast onto a chill roll at 22 meters per minute (66 feet per minute) and heated in an oven at 139° C. (283° F.) for 30 seconds, and then nearly truly uniaxially oriented at a 6:1 draw ratio to produce a reflective polarizer film of approximately 30 microns (1.2 mils) thickness after removal of the strippable polypropylene mixture outer skin layers.

This multilayer film was tested for microwrinkling—no appreciable microwrinkling was observed up to 1000 hours.

Example 6

Multilayer Optical Film—PEN/CoPEN5050HH/Xylex 7200 Reflective Polarizer Film

A multilayer reflective polarizer film may be constructed with first optical layers created from a polyethylene naphthalate and second optical layers created from co(polyethylene naphthalate) and skin layers or non-optical layers created from a cycloaliphatic polyester/polycarbonate blend commercially available from GE Plastics under the series tradename "Xylex."

The copolyethylene-hexamethylene naphthalate polymer (CoPEN5050HH) used to form the first optical layers is synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254 C at a pressure of two atmospheres ($2 \times 10^5$ N/m$^2$) and the mixture allowed to react while removing the methanol reaction product. After completing the reaction and removing the methanol (approximately 42.4 kg) the reaction vessel was charged with triethyl phosphonoacetate (55 g) and the pressure was reduced to one torr (263 N/m$^2$) while heating to 290 C. The condensation by-product, ethylene glycol, was continuously removed until a polymer with intrinsic viscosity 0.55 dl/g as measured in a 60/40 weight percent mixture of phenol and o-dichlorobenzene is produced. The CoPEN5050HH polymer produced by this method had a glass transition temperature (Tg) of 85 C as measured by differential scanning calorimetry at a temperature ramp rate of 20 C per minute. The CoPEN5050HH polymer had a refractive index of 1.601 at 632 nm.

The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5050HH layers were the second optical layers. In addition to the first and second optical layers, a set of non-optical layers, also comprised of CoPEN5050HH were coextruded as PBL (protective boundary layers) on either side of the optical layer stack. Two sets of skin layers were also coextruded on the outer side of the PBL non-optical layers through additional melt ports. Xylex 7200 was used to form the internal set of skin layers. The external skin layers were made from polypropylene-ethylene copolymer (PP8650 available from Atofina) blended with 3 wt % Pelestat 300 (available from Tomen/Sanyo.) The construction was, therefore, in order of layers: polypropylene mixture outer skin layer, Xylex 7200 inner skin layer, 825 alternating layers of optical layers one and two, Xylex 7200 inner skin layer, and a further polypropylene mixture outer skin layer.

The multilayer extruded film was cast onto a chill roll at 5 meters per minute (15 feet per minute) and heated in an oven at 150° C. (302° F.) for 30 seconds, and then uniaxially oriented at a 5.5:1 draw ratio. A reflective polarizer film of approximately 150 microns (6 mils) thickness was produced after removal of the strippable polypropylene mixture skins.

This multilayer film was tested for warping after exposure to a thermal shock test varying from −30° C. to 85° C. once per hour and minimal warping was observed after 100 hrs.

Example 7

Multilayer Optical Film—PEN/CoPEN5050HH/SA115 Reflective Polarizer Film

A multilayer reflective polarizer film may be constructed with first optical layers created from a polyethylene naphthalate and second optical layers created from co(polyethylene naphthalate) and skin layers or non-optical layers created from a cycloaliphatic polyester/polycarbonate blend commercially available from Eastman Chemical CO., under the tradename "SA115."

The above described PEN and CoPEN5050HH would be coextruded through a multilayer melt manifold to create a multilayer optical film with 275 alternating first and second optical layers. This 275 layer multi-layer stack would be divided into 3 parts and stacked to form 825 layers. The PEN layers would be the first optical layers and the CoPEN5050HH layers would be the second optical layers. In addition to the first and second optical layers, a set of non-optical layers, also comprised of CoPEN5050HH can be coextruded as PBL(protective boundary layers) on either side of the optical layer stack. Two sets of skin layers were also coextruded on the outer side of the PBL non-optical layers through additional melt ports. The non-optical layers or internal skin layers can be formed from a cycloaliphatic polyester/polycarbonate blend commercially available from Eastman Chemical Co., under the series tradename "SA115." The external skin layers would be made from polypropylene-ethylene copolymer (PP8650 available from Atofina) blended with 3 wt % Pelestat 300 (available from Tomen/Sanyo.) The construction would be, therefore, in order of layers: polypropylene mixture outer skin layer, SA115 inner skin layer, 825 alternating layers of optical layers one and two, SA115 inner skin layer, and a further polypropylene mixture outer skin layer.

The multilayer extruded film would be cast onto a chill roll at 15 meters per minute (45 feet per minute) and heated in an oven at 150° C. (302° F.) for 30 seconds, and then uniaxially oriented at a 5.5:1 draw ratio. A reflective polarizer film of approximately 150 microns (6 mils) thickness was produced after removal of the strippable polypropylene mixture skins.

This multilayer film when exposed to the thermal shock test (warp test) is expected to have an acceptable level of warp after 100 hrs.

Example 8

Multilayer Optical Film—PEN/CoPEN5050HH/Xylex 7200/CoPEN-tbia Reflective Polarizer Film A multilayer reflective polarizer film may be constructed with first optical layers created from a polyethylene naphthalate and second optical layers created from co(polyethylene naphthalate) and skin layers or non-optical layers created from a cycloaliphatic polyester/polycarbonate blend commercially available from GE Plastics under the series tradename "Xylex" and additionally blended with CoPEN-tbia.

The copolyethylene-hexamethylene naphthalate polymer (CoPEN5050HH) used to form the first optical layers is synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254 degrees C. at a pressure of two atmospheres ($2\times10^5$ N/m$^2$) and the mixture allowed to react while removing the methanol reaction product. After completing the reaction and removing the methanol (approximately 42.4 kg) the reaction vessel was charged with triethyl phosphonoacetate (55 g) and the pressure was reduced to one torr (263 N/m$^2$) while heating to 290 degrees C. The condensation by-product, ethylene glycol, was continuously removed until a polymer with intrinsic viscosity 0.55 dl/g as measured in a 60/40 weight percent mixture of phenol and o-dichlorobenzene is produced. The CoPEN5050HH polymer produced by this method had a glass transition temperature (Tg) of 85 degrees C. as measured by differential scanning calorimetry at a temperature ramp rate of 20 degrees C. per minute. The CoPEN5050HH polymer had a refractive index of 1.601 at 632 nm.

The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5050HH layers were the second optical layers. In addition to the first and second optical layers, a set of non-optical layers, also comprised of CoPEN5050HH were coextruded as PBL (protective boundary layers) on either side of the optical layer stack: Two sets of skin layers were also coextruded on the outer side of the PBL non-optical layers through additional melt ports. Xylex 7200 blended with 20 wt % CoPEN-tbia was used to form the internal set of skin layers. The external skin layers were made from polypropylene-ethylene copolymer (PP8650 available from Atofina) blended with 3 wt % Pelestat 300 (available from Tomen/Sanyo.) The construction was, therefore, in order of layers: polypropylene mixture outer skin layer, Xylex 7200/CoPEN-tbia blend inner skin layer, 825 alternating layers of optical layers one and two, Xylex 7200/CoPEN-tbia blend inner skin layer, and a further polypropylene mixture outer skin layer.

The multilayer extruded film was cast onto a chill roll at 5 meters per minute (15 feet per minute) and heated in an oven at 150° C. (302° F.) for 30 seconds, and then uniaxially oriented at a 5.5:1 draw ratio. A reflective polarizer film of approximately 125 microns (5 mils) thickness was produced after removal of the strippable polypropylene mixture skins.

This multilayer film was measured to have a haze level of 21% as measured with a Gardner haze meter. This multilayer film when exposed to the thermal shock test (warp test) is expected to have an acceptable level of warp after 100 hrs.

Example 9

Multilayer Optical Film—PEN/CoPEN5050HH/Xylex 7200/ABS Reflective Polarizer Film A multilayer reflective polarizer film may be constructed with first optical layers created from a polyethylene naphthalate and second optical layers created from co(polyethylene naphthalate) and skin layers or non-optical layers created from a cycloaliphatic polyester/polycarbonate blend commercially available from GE Plastics under the series tradename "Xylex" and additionally blended with ABS Toyolac 900 available from Tomen/Sanyo.

The copolyethylene-hexamethylene naphthalate polymer (CoPEN5050HH) used to form the first optical layers is synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254 degrees C. at a pressure of two atmospheres ($2\times10^5$ N/m$^2$) and the mixture was allowed to react while removing the methanol reaction product. After completing the reaction and removing the methanol (approximately 42.4 kg) the reaction vessel was charged with triethyl phosphonoacetate (55 g) and the pressure was reduced to one torr (263 N/m$^2$) while heating to 290 degrees C. The condensation by-product, ethylene glycol, was continuously removed until a polymer with intrinsic viscosity 0.55 dl/g as measured in a 60/40 weight percent mixture of phenol and o-dichlorobenzene is produced. The CoPEN5050HH polymer produced by this method had a glass transition temperature (Tg) of 85 degrees C. as measured by differential scanning calorimetry at a temperature ramp rate of 20 degrees C. per minute. The CoPEN5050HH polymer had a refractive index of 1.601 at 632 nm.

The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5050HH layers were the second optical layers. In addition to the first and second optical layers, a set of non-optical layers, also comprised of CoPEN5050HH were coextruded as PBL (protective boundary layers) on either side of the optical layer stacks. Two sets of skin layers were also coextruded on the outer side of the PBL non-optical layers through additional melt ports. Xylex 7200 blended with 20 wt % Toyolac 900 was used to form the internal set of skin layers. The external skin layers were made from polypropylene-ethylene copolymer (PP8650 available from Atofina) blended with 3 wt % Pelestat 300 (available from Tomen/Sanyo.) The construction was, therefore, in order of layers: polypropylene mixture outer skin layer, Xylex 7200/Toyolac 900 inner skin layer, 825 alternating layers of optical layers one and two, Xylex 7200/Toyolac 900 blend inner skin layer, and a further polypropylene mixture outer skin layer.

The multilayer extruded film was cast onto a chill roll at 5 meters per minute (15 feet per minute) and heated in an oven at 150° C. (302° F.) for 30 seconds, and then uniaxially oriented at a 5.5:1 draw ratio. A reflective polarizer film of approximately 125 microns (5 mils) thickness was produced after removal of the strippable polypropylene mixture skins.

This multilayer film was measured to have a haze level of 22% as measured with a Gardner haze meter. This multilayer film when exposed to the thermal shock test (warp test) is expected to have an acceptable level of warp after 100 hrs.

Example 10

Multilayer Optical Film—CoPEN9010/SA115 Reflective Polarizer Film

A multilayer reflective polarizer film may be constructed with first optical layers created from a polyethylene naphthalate and second optical layers created from cycloaliphatic polyester/polycarbonate blend commercially available from Eastman Chemical under the series tradename "SA115."

The copolyethylene naphthalate(CoPEN9010) used to form the first optical layers is synthesized in a batch reactor with the following raw material charge: 126 kg dimethyl naphthalene dicarboxylate, 11 kg dimethyl terephthalate, 75 kg ethylene glycol, 27 g manganese acetate, 27 g cobalt acetate, and 48 g antimony triacetate. Under pressure of 2 atm ($2 \times 10^5$ N/m$^2$), this mixture is heated to 254° C. while removing methanol. After 36 kg of methanol is removed, 49 g of triethyl phosphonoacetate is charged to the reactor and than the pressure is gradually reduced to 1 torr while heating to 290° C. The condensation reaction by-product, ethylene glycol, is continuously removed until a polymer with an intrinsic viscosity of 0.50 dL/g, as measured in 60/40 wt. % phenol/o-dichlorobenzene, is produced.

This CoPEN9010 may be coextruded with SA115 through a multilayer melt manifold to create a multilayer optical film with 275 alternating first and second optical layers. The CoPEN9010 layers would be the first optical layers and the SA115 layers would be the second optical layers. In addition to the first and second optical layers, a set of non-optical layers, also comprised of SA115 were coextruded as PBL (protective boundary layers) on either side of the optical layer stack. Two sets of skin layers were also coextruded on the outer side of the PBL non-optical layers through additional melt ports. SA115 may be used to form the internal set of skin layers. The external skin layers could be made from a blend of propylene polymers (90:10 by weight respectively of PP6671 and PP8650) to form the external set of coextruded skin layers. The construction would be, therefore, in order of layers: polypropylene mixture outer skin layer, polypropylene inner skin layer, 275 alternating layers of optical layers one and two, polypropylene inner skin layer, and a further polypropylene mixture outer skin layer.

The multilayer extruded film may be cast onto a chill roll at 22 meters per minute (66 feet per minute) and heated in an oven at 139° C. (283° F.) for 30 seconds, and then nearly truly uniaxially oriented at a 6:1 draw ratio to produce a reflective polarizer film of approximately 30 microns (1.2 mils) thickness after removal of the strippable polypropylene mixture outer skin layers.

This multilayer film would be tested for microwrinkling—no appreciable microwrinkling would be expected up to 1000 hours.

Example 11

Multilayer Optical Film—PEN/CoPEN5050HH/SA115/PC/PS Reflective Polarizer Film

A multilayer reflective polarizer film may be constructed with first optical layers created from a polyethylene naphthalate and second optical layers created from co(polyethylene naphthalate) and skin layers or non-optical layers created from a cycloaliphatic polyester/polycarbonate blend commercially available from Eastman Chemical CO., under the tradename "SA115" that is further blended with polycarbonate and polystyrene.

The above described PEN and CoPEN5050HH would be coextruded through a multilayer melt manifold to create a multilayer optical film with 275 alternating first and second optical layers. This 275 layer multi-layer stack would be divided into 3 parts and stacked to form 825 layers. The PEN layers would be the first optical layers and the CoPEN-5050HH layers would be the second optical layers. In addition to the first and second optical layers, a set of non-optical layers, also comprised of CoPEN5050HH were coextruded as PBL(protective boundary layers) on either side of the optical layer stack. Two sets of skin layers were also coextruded on the outer side of the PBL non-optical layers through additional melt ports. The non-optical layers or internal skin layers can be formed from a cycloaliphatic polyester/polycarbonate blend commercially available from Eastman Chemical Co., under the series tradename "SA115" that is additionally blended with 10 wt % polycarbonate available from Bayer as Macrolon 2458 and 20 wt % polystyrene available from Dow as Styron 685. The external skin layers would be made from polypropylene-ethylene copolymer (PP8650 available from Atofina) blended with 3 wt % Pelestat 300 (available from Tomen/Sanyo.) The construction would be, therefore, in order of layers: polypropylene mixture outer skin layer, SA115/Macrolon 2458/Styron 685 inner skin layer, 825 alternating layers of optical layers one and two, SA115/Macrolon 2458/Styron 685 inner skin layer, and a further polypropylene mixture outer skin layer.

The multilayer extruded film would be cast onto a chill roll at 15 meters per minute (45 feet per minute) and heated in an oven at 150° C. (302° F.) for 30 seconds, and then uniaxially oriented at a 5.5:1 draw ratio. A reflective polarizer film of approximately 150 microns (6 mils) thickness was produced after removal of the strippable polypropylene mixture skins. This film would be expected to have a haze value of approximately 30%.

This multilayer film when exposed to the thermal shock test (warp test) is expected to have an acceptable level of warp after 100 hrs.

Comparative Example C1

Multilayer Optical Film—PEN/PETG Reflective Polarizer Film

A multilayer reflective polarizer film was made with first optical layers of PEN and second optical layers made from polyethylene cyclohexamethylene terephthalate (PETG).

The PEN was synthesized as described in Example 1. The PETG is commercially available from Eastman Kodak (Kingsport, Tenn.) under the trade name EASTAR 6763.

The multilayer reflective polarizer film was made as described for Example 1 except that the PETG was used for the second optical layers instead of the CoPEN-tbia that was used for the second optical layers in Example 1.

The multilayer film was tested for microwrinkling—the film was permanently deformed giving very extensive bad microwrinkling after only 500 hours at 80° C.

Results

TABLE 1 shows the constructions of the multilayer optical films made in the above Examples:

TABLE 1

Multilayer optical film constructions

| Example | First optical layers | Second optical layers | Microwrinking observed at 1,000 hours or less |
|---|---|---|---|
| 1 | PEN | CoPEN-tbia | No |
| 2 | PET | CoPET-tbia I | No |
| 3 | PET | CoPET-tbia II | No |
| 4 | PET | CCH-tbia | No |

TABLE 1-continued

Multilayer optical film constructions

| Example | First optical layers | Second optical layers | Microwrinking observed at 1,000 hours or less |
|---|---|---|---|
| C1 | PEN | PETG | Yes, 500 hours |
| 5 | CoPEN8218 | Xylex 7200 | No |

Note:
As described above, Examples 1, C1, and 5 were tested at 85 degrees Celsius and Examples 2, 3 and 4 were tested at 60 degrees Celsius.

TABLE 2 shows the refractive indices and glass transition temperatures of a number of the materials from Examples 1, 2 and 3 and some commercial polyester materials. As can be seen, the tbia materials show very low refractive indices with relatively high glass transition temperatures.

TABLE 2

Glass transition temperatures and refractive indices

| Material | Tg/° C. | Refractive Index | Example(s) |
|---|---|---|---|
| PEN | 123 | 1.64 | 1, C1, 6, 7 |
| PET | 79 | 1.57 | 2, 3, 4 |
| CoPEN-tbia | 102 | 1.567 | 1 |
| CoPET-tbia I | 70 | 1.540 | 2 |
| CoPET-tbia II | 67 | 1.535 | 3 |
| CCH-tbia | 67 | 1.519 | 4 |
| CoPEN8218 | 112 | 1.628 | 5 |
| CoPEN5050HH | 87 | 1.601 | 6, 7 |
| PETG | 83 | 1.565 | C1 |
| PCTG | 88 | 1.555 | — |
| ECDEL | 5 | 1.54 | — |
| Xylex 7200 | 113 | 1.555 | 5, 6 |
| SA115 | 115 | 1.57 | 7 |

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A multilayered polymer film, comprising:
 a plurality of first optical layers comprising a birefringent first copolyester or polyester;
 a plurality of second optical layers comprising a second copolyester having an in-plane birefringence of 0.04 or less at 632.8 nm, after the multilayered polymer film has been formed; and
 a non-optical skin layer disposed on the plurality of first optical layers or plurality of second optical layers, the skin layer comprising a cyclo-aliphatic copolyester and polycarbonate blend.

2. A multilayered polymer film according to claim 1, wherein the non-optical skin layers comprise a blend of cyclo-aliphatic polyester and polycarbonate having a first refractive index value and an immiscible polymer having a second refractive index value, wherein the first refractive index value and the second refractive index value are the same.

3. A multilayered polymer film according to claim 2, wherein the non-optical skin layers comprise a blend of cyclo-aliphatic polyester and polycarbonate and CoPEN-tbia.

4. A multilayered polymer film according to claim 2, wherein the non-optical skin layers comprise a blend of cyclo-aliphatic polyester and polycarbonate and polystyrene or polystyrene copolymers.

5. A multilayered polymer film of claim 1, wherein the non-optical skin layers comprise a blend of cyclo-aliphatic polyester and polycarbonate having a first refractive index value and an immiscible polymer having a second refractive index value, wherein the first refractive index value and the second refractive index value are different.

6. A multilayered polymer film according to claim 5, wherein the non-optical skin layers comprise a blend of cyclo-aliphatic polyester and polycarbonate and polystyrene copolymers.

* * * * *

UNITED STATES PATENT AND TRADEMARK OFFICE
CERTIFICATE OF CORRECTION

PATENT NO. : 7,345,137 B2
APPLICATION NO. : 10/967582
DATED : March 18, 2008
INVENTOR(S) : Timothy J. Hebrink It is certified that error appears in the above-identified patent and that said Letters Patent is hereby corrected as shown below:

Column 6
Line 35, Delete ""x,"" and insert -- "x", --, therefor.

Column 11
Line 67, Delete "acyrilonitrile" and insert -- acrylonitrile --, therefor.

Column 13
Line 29, After "FIG. 2," delete "to,".
Line 44, Delete "$an_y$" and insert -- any --, therefor.

Column 15
Line 42, Delete "$an_y$" and insert -- any --, therefor.

Column 16
Line 22, Delete "microwrinklirig" and insert -- microwrinkling --, therefor.

Column 21
Line 23, Delete "(1 ml)" and insert -- (III) --, therefor.

Column 22
Line 45, Delete "phenollo-dichlorobenzene" and insert -- phenol/o-dichlorobenzene --, therefor.
Line 47, After ""coPEN8218"" insert -- . --.

Column 23
Line 31, Delete "254 C" and insert -- 254° C. --, therefor.
Line 37, Delete "290 C." and insert -- 290° C. --, therefor.
Line 43, Delete "85 C" and insert -- 85° C. --, therefor.
Line 44, Delete "20 C" and insert -- 20° C. --, therefor.

UNITED STATES PATENT AND TRADEMARK OFFICE
CERTIFICATE OF CORRECTION

PATENT NO. : 7,345,137 B2
APPLICATION NO. : 10/967582
DATED : March 18, 2008
INVENTOR(S) : Timothy J. Hebrink It is certified that error appears in the above-identified patent and that said Letters Patent is hereby corrected as shown below:

Column 28
Line 1, Delete "Microwrinking" and insert -- Microwrinkling --, therefor.

Signed and Sealed this

Fourteenth Day of October, 2008

JON W. DUDAS
*Director of the United States Patent and Trademark Office*